United States Patent [19]

Danzuka et al.

[11] Patent Number: 5,207,813
[45] Date of Patent: May 4, 1993

[54] METHOD FOR PRODUCING GLASS ARTICLE

[75] Inventors: Toshio Danzuka; Masumi Ito; Masahiro Takagi; Hiroshi Yokota, all of Yokohama, Japan

[73] Assignee: Sumitomo Electric Industries, Ltd., Japan

[21] Appl. No.: 754,470

[22] Filed: Sep. 4, 1991

[30] Foreign Application Priority Data

Sep. 7, 1990 [JP] Japan .................................. 2-238507

[51] Int. Cl.$^5$ ............................................ C03B 37/018
[52] U.S. Cl. ...................................... 65/3.12; 65/18.2; 65/60.5
[58] Field of Search ...................... 65/3.12, 18.2, 60.8, 65/60.5

[56] References Cited

U.S. PATENT DOCUMENTS

| | | | |
|---|---|---|---|
| 4,529,427 | 7/1985 | French | 65/3.12 |
| 4,610,892 | 9/1986 | Eisbrenner et al. | 65/3.12 |
| 4,618,354 | 10/1986 | Suda et al. | 65/3.12 |
| 4,642,129 | 2/1987 | Douklias et al. | 65/3.12 |
| 4,661,140 | 4/1987 | Takimoto et al. | 65/3.12 |
| 4,781,740 | 11/1988 | Danzuka et al. | 65/3.12 |
| 4,826,520 | 5/1989 | Kawazoe et al. | 65/3.12 |
| 4,915,716 | 4/1990 | Monroe et al. | 65/3.12 |

FOREIGN PATENT DOCUMENTS

| | | |
|---|---|---|
| 0018068 | 10/1980 | European Pat. Off. . |
| 0156370 | 10/1985 | European Pat. Off. . |
| 0190748 | 8/1986 | European Pat. Off. . |
| 0154500 | 10/1986 | European Pat. Off. . |
| 0213501 | 3/1987 | European Pat. Off. . |
| 48-73522 | 10/1973 | Japan . |
| 56-014443 | 2/1981 | Japan . |
| 58-167440 | 10/1983 | Japan . |
| 59-190235 | 10/1984 | Japan . |
| 60-4979 | 2/1985 | Japan . |
| 60-112636 | 6/1985 | Japan . |
| 62-28100 | 6/1987 | Japan . |
| 62-50418 | 10/1987 | Japan . |
| 2-102146 | 4/1990 | Japan . |
| 2-164733 | 6/1990 | Japan . |
| 2059944 | 4/1981 | United Kingdom . |

OTHER PUBLICATIONS

Suda, "High-Rate Fabrication of Optical Fiber Preforms by the Multi-Flame VAD Method", Review of the Electrical Communication Laboratories, vol. 35, No. 5, Sep. 1987, Tokyo, pp. 547–552.
Suda et al., "High-Rate Synthesis Mechanism in the Multi-Flame VAD Method", European Conference on Optical Communication XII, 22–25, Sep. 1986, ES, Technical Digest vol. I, pp. 59–62.
Murata, "Recent Developments in Vapor Phase Axial Deposition", Journal of Lightwave Technology, vol. LT-4, No. 8 Aug. 1986, New York, pp. 1026–1033.

Primary Examiner—Robert L. Lindsay

[57] ABSTRACT

A glass article is produced at a high production rate and a high yield by jetting a glass-forming raw material from a multi-port burner, synthesizing glass soot through hydrolysis of the glass-forming raw material, depositing the glass soot to form a soot preform and heating and vitrifying the soot preform to produce a transparent glass article, wherein the glass-forming raw material is vaporized by heating it at a temperature higher than its boiling point and directly supplied to the burner, the vaporized glass-forming raw material and a fuel gas for synthesizing glass soot are supplied to an inner port of the multi-port burner and a fuel gas for heating a formed preform is supplied to an outer port of the multi-port burner, and a molar ratio of water generated by a reaction of the fuel gas for synthesizing glass soot to the glass-foring raw material is from to 2 to 3.

8 Claims, 1 Drawing Sheet

METHOD FOR PRODUCING GLASS ARTICLE

BACKGROUND OF THE INVENTION

1. Field of the Invention

The present invention relates to a method for producing a glass article. In particular, the present invention relates to a method for producing a glass article from glass soot (fine particles) deposit which is produced by a glass soot synthesis method such as a vapor phase axial deposition (VAD) method or a outside vapor deposition (OVD) method.

2. Description of the Related Art

To synthesize a glass soot deposit, there is known a VAD method which comprises jetting a mixture of a fuel gas, a combustion-support gas and a glass-forming raw material from a burner, forming glass soot through hydrolysis or oxidation of the glass-forming raw material in a flame, depositing the glass soot at a tip end of a rotating starting member to form a soot deposit while moving the starting member in relation to the burner as the soot deposit grows. Also, there is known an OVD method which comprises depositing glass soot which is generated with a burner around an peripheral surface of a starting member while traversing either of the burner or the starting member more than one time to form a soot deposit (see, for example, Japanese Patent Kokai Publication No. 73522/1973).

In the synthesis of the glass soot, a multi-flame type burner is proposed to increase deposition efficiency of particulate glass which is generated by the burner on the soot deposit. As disclosed in Japanese Utility Model Publication No. 4979/1985 and Japanese Patent Publication No. 50418/1987, the multi-flame type burner is typically a coaxial multi-port burner which comprises, at a center part, a glass soot-synthesizing port which has a sub-port for jetting the glass-forming raw material, a sub-port for the fuel gas and a sub-port for the combustion-support gas, and at a peripheral part, at least one flame-forming port which protrudes in the direction of the gas stream in relation to an outlet of the glass soot-synthesizing port and has a sub-port for the fuel gas and a sub-port for the combustion-support gas. Hitherto, using such multi-flame type burner, the deposition efficiency of the glass soot has been improved.

The glass-forming raw material is supplied by a bubbling method with a carrier gas as shown in FIG. 3 or a direct supply method using a vapor pressure of the raw material itself, mixed with oxygen gas or hydrogen gas and then introduced in the burner.

In the soot synthesis, development has been directed to increase of a synthesis rate (a weight of a soot preform produced per a unit time) and increase of productivity. However, when a flow rate of the glass-forming raw material is increased to increase the synthesis rate, a ratio of the preform weight to an amount of the synthesized glass which is theoretically calculated from the flow rate of the glass-forming raw material, namely a yield decreases, and therefore, the synthesis rate has an upper limit. To solve such problem, various techniques such as acceleration of gas mixing or control of the gas flow rate (a Raynolds' number) (cf. Japanese Patent Publication No. 28100/1987) have been proposed. However, none of them is an fundamental solution of the problem.

Then, it is highly required to provide a production method of a soot deposit by which the glass-forming raw material is effectively reacted in the flame to grow glass soot and then the grown soot is effectively deposited on a surface of the already deposited soot.

SUMMARY OF THE INVENTION

An object of the present invention is to provide a method for producing a glass article which solves the above problems which arise in the production of the soot deposit.

According to the present invention, there is provided a method for producing a glass article comprising steps of jetting a glass-forming raw material from a multi-port burner, synthesizing glass soot through hydrolysis of said glass-forming raw material, depositing said glass soot to form a soot preform and heating and vitrifying said soot preform to produce a transparent glass article, wherein said glass-forming raw material is vaporized by heating it at a temperature higher than its boiling point and directly supplied to said burner, said vaporized glass-forming raw material and a combustion gas mixture for synthesizing glass soot are supplied to an inner port of said multi-port burner and a combustion gas mixture for heating a formed preform is supplied to an outer port of said multi-port burner, and a molar ratio of water generated by a reaction of said combustion gas for synthesizing glass soot to said glass-forming raw material is from 2 to 3.

DETAILED DESCRIPTION OF THE DRAWINGS

Figure 1:
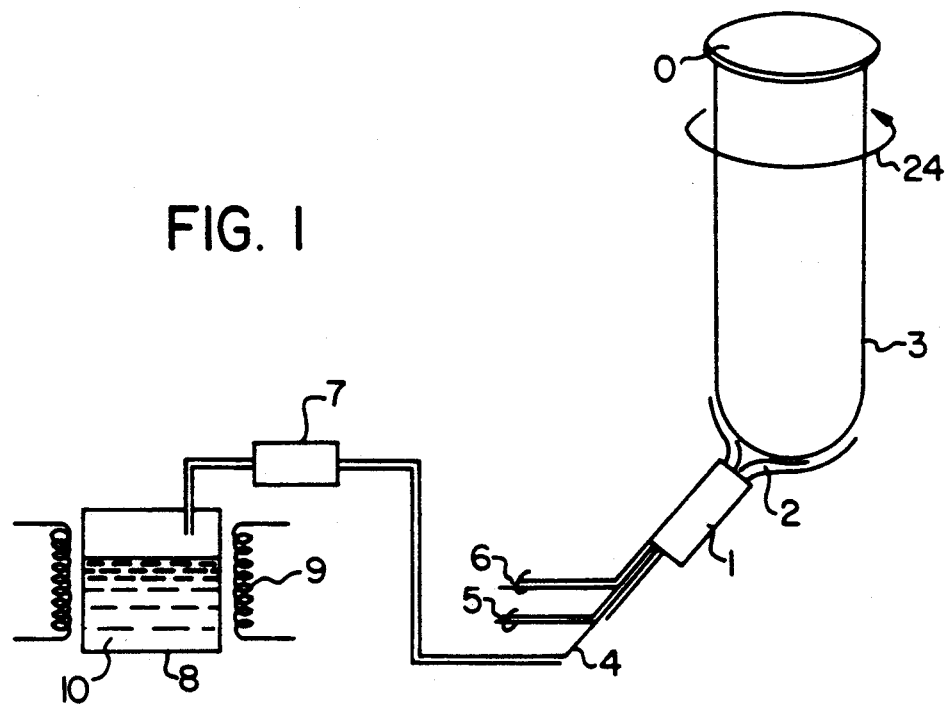
FIG. 1 schematically shows an apparatus used for carrying out the method of the present invention.

FIG. 1 schematically shows the method of the present invention. A flame 2 is generated by a combustion burner 1 having a multi-flame structure. By jetting a vaporized glass-forming raw material into the flame 2, glass soot is synthesized in the flame 2 and deposited on a starting member 0 to produce a soot preform 3. In this step, the glass-forming material is supplied to a center part of the burner 1 through a pipe 4 which is kept warm. The glass-forming raw material is supplied to the burner with its own vapor pressure which is generated by heating a liquid form raw material 10 in a tank 8 with a heater 9 to increase the vapor pressure, and its flow rate is controlled by a flow control device 7. Using such supply system, the glass-forming raw material as such can be supplied to the center part of the burner 1 (direct supply) without mixing it with a carrier gas such as an inert gas.

The fuel gas for synthesizing glass soot is supplied to the inner part of the burner through gas supply tubes 5, and the fuel gas for heating the soot preform is supplied through supply tubes 6 to an outlet provided at an outer part of the outlet for the fuel gas for synthesizing glass soot. The fuel gas for synthesizing glass soot is supplied at a flow rate sufficient for generating an amount of water required for hydrolysis of the glass-forming raw material. For example, when the glass-forming raw material is supplied at a flow rate of Q l/min., hydrogen gas as the fuel gas is supplied at a flow rate of 2Q l/min., and methane as the fuel gas is supplied at Q l/min. In this step, the combustion-support gas is supplied in an amount larger than an equivalent amount to avoid overheat of the burner and prevent deposition of the glass soot on the burner. Thereby, the amount of water is two times an amount required for hydrolysis of $SiCl_4$, and a minimum amount of water required for hydrolysis is supplied If this flow rate is too large, the flow speed is increased and the temperature at the surface where the glass soot is deposited is excessively increased. Then, the molar ratio of water to $SiCl_4$ is preferably 3 or less.

Figure 3:
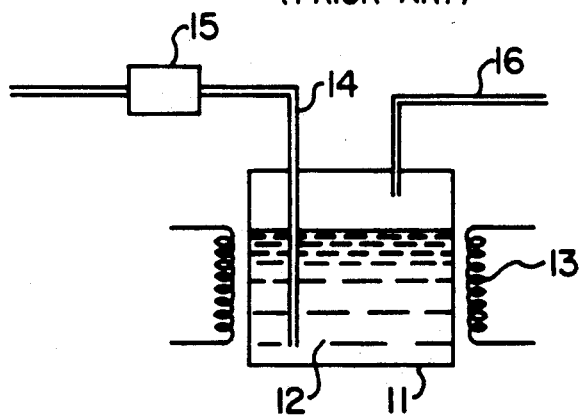
FIG. 3 shows a conventional method for supplying the glass-forming raw material by the bubbling method.

Since the glass-forming gas is jetted without including any gas which does not contribute to the reaction, the jetting speed can be made lower than the bubbling method as shown in FIG. 3, and it is well mixed with the fuel gas which flows the outer layer of the flame. Since the fuel gas is supplied in an amount necessary for the reaction, there is no problem that the flow speed is increased only in the outer layer of the flame so that the gas mixing is interfered. Then, the hydrolysis of the glass-forming material proceeds sufficiently.

Since the glass-forming raw material is supplied only in the inner part of the burner, the formed glass soot concentrates and flows around a center axis of the flame of the burner, and since any other gas is not included, the concentration of the soot in the flame is kept relatively high.

Since the bubbling method requires heating of the carrier gas, an amount of the fuel gas should be increased, so that the flow speed of the hydrogen gas in the outer part should be increased and the gas flow is disturbed, whereby the formed glass soot tends to be scattered outwardly and deposition of the glass soot becomes difficult.

Figure 4:
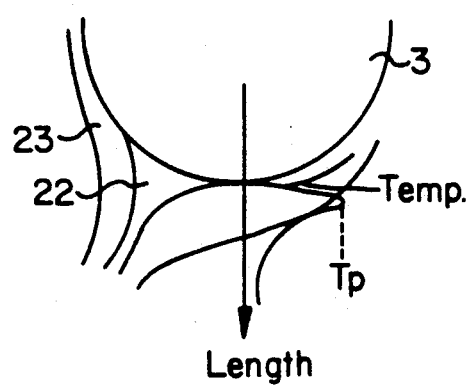
FIG. 4 shows a temperature profile near the surface of the soot preform which is being grown.
Figure 5:
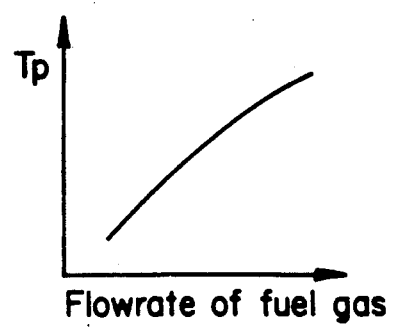
FIG. 5 is a graph schematically showing a relationship between the peak temperature near the soot preform and the flow rate of the fuel gas.

A flame for heating the formed soot preform is generated by the fuel gas jetted around the flame for synthesizing the glass soot. It has been found that the flame for heating the formed soot preform not only heats the soot preform but also facilitates the deposition of the soot on the surface of the already formed soot preform. That is, since the glass soot particles synthesized in the flame have very small particle size of 0.1 to 0.5 μm, they have small inertial force and act as if they are substantially in a gas state in a region having no temperature profile. In contrast, in a region having a temperature profile, they have a tendency to move from a high temperature part to a low temperature part since molecular motion of the gas in the high temperature part is more active than in the low temperature part and the particles receive force towards the low temperature part. This effect is called a "thermophoresis effect". The present inventors have found that, in the deposition of the soot in the soot synthesis method, the thermophoresis effect is predominant, and its relationship with the flame has been investigated. As the result, it has been found that there is a temperature profile near the preform surface as shown in FIG. 4. That is, due to the double layer structure of the flame consisting of the flame 22 for synthesizing the soot and the flame 23 for heating the soot preform, the temperature profile has a peak temperature $T_p$ near the soot preform, and this $T_p$ depends on the flame for heating the soot preform. More precisely, the flow rate of the fuel gas for the flame for heating the soot preform and the $T_p$ has a relationship as shown in FIG. 5.

Then, a relationship between $T_p$ and the deposition efficiency of the soot is investigated to find that a good correlation exists. That is, when $T_p$ is 2000° C. or lower, the yield is lower than 50%, while when $T_p$ is higher than 2000° C., the yield increases. Preferably, $T_p$ is from 2400° to 2800° C.

The reason why the prior arts increased the amount of the fuel gas for the flame for synthesizing the soot or mixed the fuel gas with the glass-forming raw material in the prior arts may be that compensation of the insufficient heating of the outer flame for heating the soot preform was expected. However, the defects of such techniques are described above.

If $T_p$ is increased too much, for example, the peak temperature exceeds 3000° C., the surface temperature of the soot preform increases so that the thermophoresis effect is diminished. In addition, the soot preform is overheated and does not further grow or tends to deform.

PREFERRED EMBODIMENTS OF THE INVENTION

The present invention will be illustrated by following Examples.

Comparative Example 1

A coaxial eight port burner was used, and hydrogen gas and oxygen gas were used as a fuel gas and a combustion-support gas, respectively.

Figure 2:
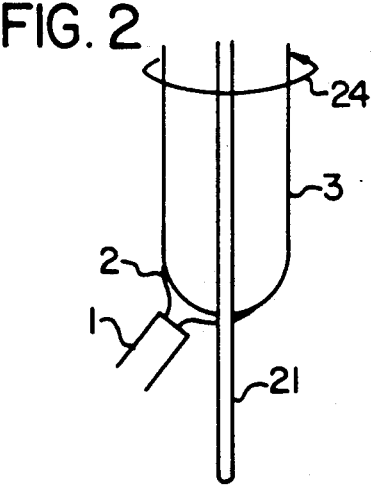
FIG. 2 shows how to deposit the glass soot on the starting member.

The burner was placed as shown in FIG. 2, and a glass-forming raw material, hydrogen gas, an inert gas (argon), oxygen gas, an inert gas (argon), hydrogen gas, an inert gas (argon) and oxygen gas were supplied from respective ports in this order from the center port to the outermost port. As the raw material, $SiCl_4$ was used and supplied to the burner by the bubbling method as shown in FIG. 3. The actual flow rate of the raw material was adjusted to 2.84 l/min. by flowing an argon carrier gas at a flow rate of 2 l/min. and controlling a temperature of a bubbler.

For generating a flame for synthesizing the soot, hydrogen gas as the fuel gas was supplied at a flow rate of 8 l/min., oxygen gas as the combustion-support gas was supplied at a flow rate of 18 l/min., and argon gas was supplied at a flow rate of 3 l/min. In addition, hydrogen gas was added to the raw material at a flow rate of 1 l/min.

For generating a flame for heating the soot preform, hydrogen gas, oxygen gas and argon gas were supplied at flow rates of 20 l/min., 25 l/min. and 8 l/min., respectively.

Under the above conditions, the soot preform was produced at a rate of 3.8 g/min., and a yield was about 50%.

Example 1

In the same manner as in Comparative Example 1 but supplying the glass-forming raw material by the direct method as shown in FIG. 1, a soot preform was produced SiCl4, hydrogen gas, argon gas, oxygen gas, argon gas, hydrogen gas, argon gas and oxygen gas were supplied in this order from the center port to the outermost port at flow rates of 2.84 l/min., 5.7 l/min., 3 l/min., 18 l/min., 4 l/min., 20 l/min., 4 l/min and 25 l/min., respectively.

The preform was produced at a rate of 5.5 g/min., and a yield was 72%.

Comparative Example 2

In the same manner as in Example 1 but changing the flow rate of hydrogen gas as a fuel gas of the flame for heating the soot preform, a soot preform was produced to investigate a relationship between the peak temperature and the yield. In Example 1, the flow rate of hydrogen gas was 20 l/min. When this rate was reduced to 10 l/min., the peak temperature $T_p$ decreased to about 1800° C., which was measured simply by heating a heat resistant plate with the flame and measuring a temperature by a radiation thermometer. Then, the synthesis rate decreased to 3.2 g/min., and the yield decreased to 42%.

When the flow rate of hydrogen gas was further decreased, the yield further decreased and could not be recovered.

Example 2

In the same manner as in Example 1 but changing the flow rate of hydrogen gas as a fuel gas of the flame for heating the soot preform, a soot preform was produced to investigate a relationship between the peak temperature and the yield. In this Example, the flow rate of hydrogen gas was changed to 20 l/min., 30 l/min., 40 l/min. or 50 l/min., and respectively the flow rate of oxygen gas was increased to 25 l/min., 30 l/min., 38 l/min. or 45 l/min. As the results, $T_p$ was raised to about 2200° C., 2650° C., 2900° C. or 3100° C., respectively, and the deposition rate (the yield) was 5.5 g/min. (72%), 6.1 g/min. (81%), 5.9 g/min. (78%) or 4.9 g/min. (65%), respectively. At the hydrogen flow rate of 50 l/min., the preform grew slowly and was slightly deformed. Under other conditions, the good preforms were produced.

The soot preform produced by the present invention is heated to a temperature of at least 1600° C. with conventional heating means such as an electric heater to obtain a transparent glass preform with good quality, and the transparent preform is used in the fabrication of an optical fiber.

The soot preform produced by the method as shown in FIG. 2 is made transparent and then drawn in a drawing furnace to obtain an optical fiber with excellent quality.

In the above Examples, $SiCl_4$ was used as the glass-forming raw material, and hydrogen gas and oxygen gas were used as the fuel gas and the combustion-support gas. Alternatively, as the raw material, $SiHCl_3$, $SiH_2Cl_2$ and the like may be used, and as the fuel gas, $CH_4$, $C_2H_6$, $C_3H_8$ and the like may be used. As the inert gas, nitrogen gas and the like may be used in place of argon. With these alternative gasses, the effects of the present invention can be achieved.

To the glass-forming raw material, an additive for changing a refractive index (e.g. $GeCl_4$, $BCl_3$, $CF_4$, etc.) may be added.

What is claimed is:

1. A method for producing a glass article comprising the steps of:
   vaporizing a glass-forming raw material by heating said glass-forming material to a temperature higher than a boiling point of said glass-forming material;
   supplying said vaporized glass-forming material and a first combustion gas mixture to an inner port of a multi-port burner, a molar ratio of water generated by a reaction of said first combustion gas mixture to said vaporized glass-forming material being from 2 to 3;
   supplying a second combustion gas mixture to an outer port of said multi-port burner for heating a formed preform;
   jetting said vaporized glass-forming raw material from said inner port of said multi-port burner;
   synthesizing glass soot through hydrolysis of said vaporized glass-forming raw material;
   depositing said glass soot to form a soot preform; and
   heating and vitrifying said soot preform to produce a transport glass article.

2. A method according to claim 1, wherein said glass-forming raw material is selected from the group consisting of $SiCl_4$, $SiHCl_3$, and $SiH_2Cl_2$.

3. A method according to claim 1, wherein said first combustion gas mixture comprises a fuel gas and a combustion-support gas, said fuel gas is selected from the group consisting of $H_2$, $CH_4$, $C_3H_8$, and $C_2H_6$, and said combustion-support gas is selected from the group consisting of oxygen gas and gases containing oxygen.

4. The method according to claim 1, wherein a flow rate of said combustion gas mixture for heating a formed preform is so adjusted that a temperature profile of a flame in a normal direction in relation to a surface of said preform where glass soot is being deposited has a peak temperature in a range between 2000° C. and 3000° C.

5. The method according to claim 1, wherein said glass soot is deposited on a rotating starting member, and a cylindrical soot preform is grown with relatively moving said combustion burner and said starting member.

6. The method according to claim 5, wherein said cylindrical preform has a higher refractive index at its center part than that at its peripheral part.

7. The method according to claim 1, wherein said glass soot is deposited around a peripheral surface of a rotating starting rod, and said starting rod is moved in its axial direction in relation to said combustion burner.

8. The method according to claim 7, wherein said starting rod is a transparent glass rod comprising a core part and a cladding part.

* * * * *